United States Patent [19]
Miller

[11] Patent Number: 5,163,460
[45] Date of Patent: Nov. 17, 1992

[54] AWNING TRAVEL LOCK

[75] Inventor: Robert H. Miller, Schaumburg, Ind.

[73] Assignee: Nu-Zip Dee Mfg., Inc., Elk Grove Village, Ill.

[21] Appl. No.: 603,430

[22] Filed: Oct. 26, 1990

[51] Int. Cl.⁵ .............................................. E04H 15/08
[52] U.S. Cl. ........................................ 135/89; 292/101
[58] Field of Search ............... 292/345, 101, 95, 100; 160/67; 135/89

[56] References Cited

U.S. PATENT DOCUMENTS

| | | | |
|---|---|---|---|
| 964,056 | 7/1910 | Sandquist | 292/101 |
| 996,792 | 7/1911 | Peterson | 292/104 |
| 1,120,943 | 12/1914 | Kirn | 292/95 |
| 2,107,608 | 2/1938 | Hewlett | 135/89 |
| 3,426,775 | 2/1969 | Tonckheere | 135/89 |
| 4,576,192 | 3/1986 | Duda | 135/89 |
| 4,941,524 | 7/1990 | Greer | 160/67 |

FOREIGN PATENT DOCUMENTS

| | | | |
|---|---|---|---|
| J6003 | 6/1956 | Fed. Rep. of Germany | 292/101 |
| 20855 | 1/1946 | Finland | 292/101 |
| 2527429 | 12/1983 | France | 135/89 |

Primary Examiner—Henry E. Raduazo
Attorney, Agent, or Firm—Emrich & Dithmar

[57] ABSTRACT

A latch mechanism for maintaining an awning having a cover in a rolled up condition during storage or travel of a recreational vehicle on which the awning is mounted. The latch mechanism has a hook mechanism on the awning cover such that when the awning is in a rolled up condition, the hook is movable between an engaged locked position and an unengaged unlocked position. A catch is mounted on the recreational vehicle for engaging a portion of the hook mechanism in the engaged locked position of the hook mechanism which has an apertured actuating portion for engagement by a remotely controlled actuator for moving the hook into and out of the locked position thereof.

6 Claims, 1 Drawing Sheet

AWNING TRAVEL LOCK

BACKGROUND OF THE INVENTION

This invention relates to a locking or latching mechanism primarily for maintaining a rolled up window awning or a rolled up patio awning in place on the side of a recreational vehicle when the recreational vehicle moves from place to place or when the recreational vehicle is at rest and the awning is in the storage or rolled up position.

It has become relatively common place for recreational vehicles to be fitted with awnings, not only over the windows but in most cases also with what is known as patio awnings which may be twenty to thirty feet in length and which are pulled out when the recreational vehicle is parked to provide shade and a place for relaxation.

Although there are many different types of awnings, some of the awnings have metal cases which wrap around the awning when the awning is rolled up or in the storage position. Although it would seem that the metal cases would be sufficient to maintain the awning in place, it has been found that during travel, it is possible for the fabric portion of the awning to become unrolled or to loosen during travel when subjected to wind resistance, causing the fabric to flap and resulting in the metal cover rattling or knocking against the recreational vehicle and perhaps damaging the vehicle or at the very least, making an annoying repetitive noise.

Locks have been used in the past in an attempt to deal with this problem and certain of these travel locks, as they are sometimes called, have been adequate for their intended purpose. In the recent past, travel trailers have been constructed with a large storage compartment added at the bottom of the trailer which causes the living compartment to be elevated above what it previously was. These travel trailers with storage compartments on the bottom, typical of interstate passenger carrying buses, then have the windows over which the awnings are positioned elevated with respect to the ground. In many cases, the tops of the awnings whereat the metal case is located is so far elevated that a locking mechanism for such an awning case is unreachable from the ground without a ladder. In order to avoid requiring the user to have a ladder available in order to lock and unlock awnings before and after travel, the present invention was conceived and has been found to be very satisfactory in providing a remotely controllable travel lock which will provide a secure lock for an awning during travel and yet can be operated from the ground without the necessity of climbing a ladder, which may be a problem for elder people who are often the users of recreational vehicles of the type discussed herein.

OBJECTS OF THE INVENTION

Accordingly, it is an object of the invention to provide an easy to actuate travel lock for an awning having a metal cover which can be operated from the ground without the use of ladders or other climbing devices.

Another object of the invention is to provide a latch mechanism for maintaining an awning having a cover in a rolled up condition during storage or travel of a recreational vehicle on which the awning is mounted, the latch mechanism comprising a hook mechanism as mounted on the awning cover such that when the awning is in a rolled up condition the hook mechanism is movable between an engaged locked position and an unengaged unlocked position, a receiver mechanism having a catch mounted on the recreational vehicle for engaging a portion of the hook mechanism in the engaged locked position of said hook mechanism, the hook mechanism having an apertured actuating portion for engagement by a remotely controlled actuator for moving the hook mechanism from an engaged locked position to an unengaged unlocked position and from an unengaged unlocked position to an engaged locked position by an operator remote from the latch mechanism.

A final object of the invention is to provide a combination of a recreational vehicle having an outer metal skin, an awning mounted to the outer metal skin, the awning having a metal cover connected to an awning fabric, the metal cover being movable between a storage condition wherein the awning fabric is rolled and covered by the metal cover and a use condition wherein the awning fabric extends away from the vehicle to provide shade, a latch mechanism having a hook mechanism and a receiver mechanism, the hook mechanism mounted on the metal cover such that when the awning is in a rolled up condition the hook mechanism is movable between an engaged locked position and an unengaged unlocked position, the receiver mechanism having a catch mounted on the recreational vehicle for engaging a portion of the hook mechanism in the engaged locked position of the hook mechanism, the hook mechanism having an apertured actuating portion for engagement by a remotely controlled actuator for moving the hook mechanism from an engaged locked position to an unengaged unlocked position and from an unengaged unlocked position to an engaged locked position by an operator remote from the latch mechanism.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there is illustrated in the accompanying drawings a preferred embodiment thereof, from an inspection of which, when considered in connection with the following description, the invention, its construction and operation, and many of its advantages should be readily understood and appreciated.

DETAILED DESCRIPTION OF THE PREFERRED EMBODIMENT

Figure 1:
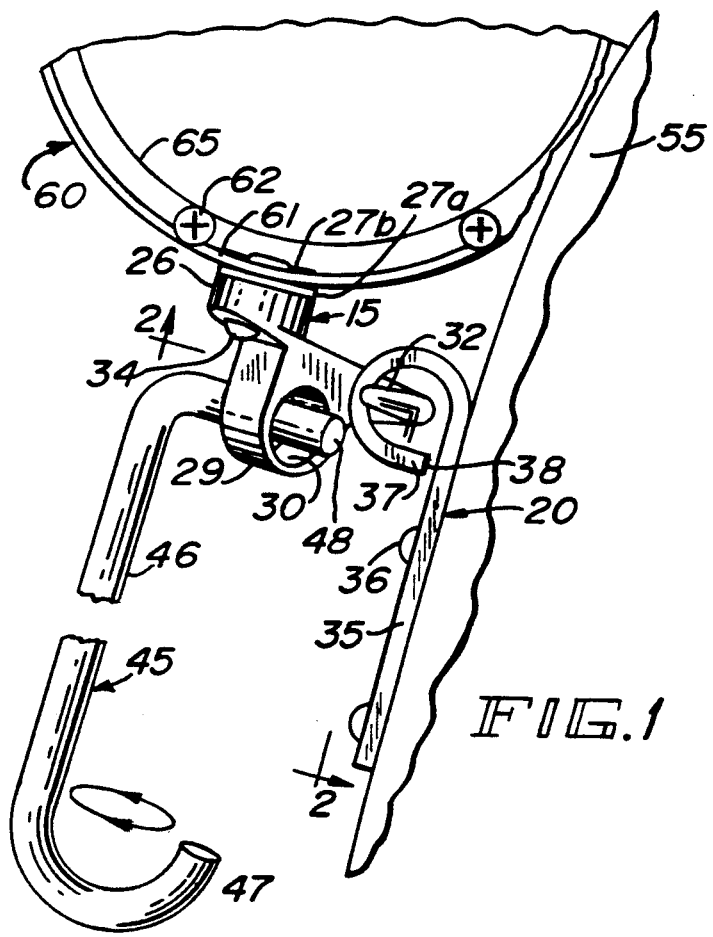
FIG. 1 is an enlarged fragmented view of a travel lock incorporating the invention showing an actuator rod in place.

Referring now to the drawings, there is disclosed a latch mechanism 10 which includes a hook assembly portion 15 and a receiver mechanism 20, the hook assembly 15 being mounted on a slatted metal case 60 for an awning 65 shown in FIG. 1 by a single curved line but in reality would be represented by a plurality of folds of awning material in the storage or rolled up position, with the receiver mechanism 20 mounted to the motor coach skin 55. The latch mechanism 10 is useful both on patio awnings and on window awnings, the difference between the two types of awnings 65 is that patio awnings generally have a length of between ten and thirty feet and window awnings generally do not exceed about eight feet in length. In cases where there are long awnings, two latch mechanisms 10 of the type herein disclosed may be used, one near each end of the awning.

Each latch mechanism 10 consists of a hook assembly 15 and a receiver mechanism 20. The hook mechanism 15 is preferably made of metal and is a one-piece casting having a body member 25 which includes a shoulder portion 26 having an internally threaded aperture 27 and terminating in a flat mounting surface 28. The body member 25 also includes a ring portion 29 having a large actuating aperture 30 therethrough and an upwardly turned hook portion 31 having a free end 32 and an abutment surface 33. It should be noted that the ring portion 29 of the body member 25 lies in a plane generally perpendicular to the plane formed by the hook 31 which lies in a plane generally parallel to that formed by the end mounting surface 28 of the shoulder 26. The purpose for the spatial relationship between the hook 31 and the actuating aperture 30 will be explained hereafter.

Finally, the hook assembly 15 is mounted to an appropriate portion of the slatted metal cover 60 and particularly to a slat 61 which is maintained in place by rivots 62. The assembly 15 is connected to the cover 60 by a locking fastener 34 of the type which has a deformable plastic inserted along the threads such that when the fastener 34 is inserted into the threaded aperture 27 it locks in place and retains the hook assembly 15 even with repeated rotational movement of the assembly 15. The shifting or rotational movement of the hook assembly 15 is facilitated by a pair of washers 27a and 27b, one on each side of the slat 61, it being understood that the fastener 34 is preferably attached with the head of the fastener on the inside of the slat 61.

The receiver mechanism 20 preferably is a single piece of metal having a flat mounting portion 35 connected to the motor coach skin 55 by a pair of rivots 36. The single piece of metal 20 is formed into a generally circular catch portion 37 having a free end 38 positioned close to but not necessarily in abutment with the flat portion 35. Finally, the latch mechanism 10 consisting of both the hook assembly 15 and the receiver mechanism 20 is actuated by means of an elongated actuator rod 45 having a shaft 46, a handle 47 and an angularly positioned engagement end 48. As shown, the engagement end 48 is generally perpendicular to the elongated shaft 46 and the handle 47 while shown to be somewhat curved may be any comfortable configuration.

As seen in FIG. 1, the actuator mechanism or rod 45 is twisted in a circular motion to the right as viewed in the figure to lock or engage the hook 31 with the catch portion 37 and to the left or into the plane of the paper to disengage the latch mechanism 10.

Although the latch mechanism 10 is relatively simple in conception and operation, the angular position of the ring portion 29 with respect to the hook 31 permits remote operation of the latch mechanism 10 to the locked position illustrated in the drawings and an unlocked position wherein the hook assembly 15 is pivoted to the left as seen in FIG. 1 until the hook 31 is disengaged from the catch portion 37 so as to permit the awning 65 nested within the slatted metal case 60 to be pulled out from within the case 60 into a use or extended position.

Previous travel locks in the industry have not been constructed to permit remote operation of the type now required by the introduction of the storage compartments in travel trailers at the bottom of the travel trailer, resulting in an elevated position of the windows and patio awnings. Prior art latches include hook and catch portions, but none is as easy to operate remotely as is the present invention. This feature provides a great safety factor for senior citizens. The latch mechanism 10 is also useful even on motor coaches with lower windows and lower patio awnings where the owners of the coaches are elderly.

Figure 2:
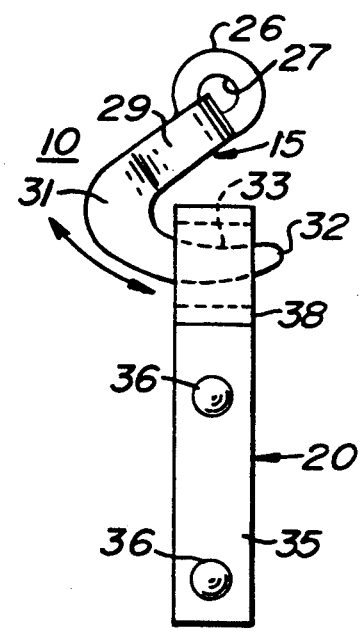
FIG. 2 is a view of the device illustrated in FIG. 1 as seen along lines 2—2 thereof.
Figure 3:
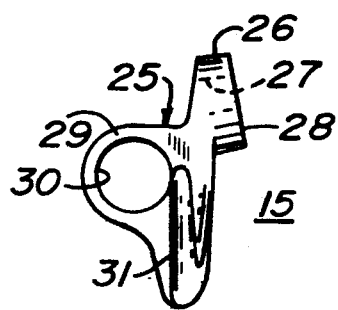
FIG. 3 is a side elevational view of the hook mechanism illustrated in FIG. 1.

As can be seen therefore, there has been provided a latch mechanism 10 which may easily be operated from a remote or distant position by use of a actuator rod 45 which enables the locking mechanism 10 to be engaged as illustrated in the drawings or disengaged to permit use of the awning 65. With the latch or locking mechanism 10 in the engaged position as shown in FIGS. 1 and 2, the recreational vehicle may be moved from place to place without fear that the awning 65 will come free or that the metal cover 60 rattle against the coach 55.

While there has been disclosed what is considered to be the preferred embodiment of the present invention, it is understood that various changes in the details may be made without departing from the spirit, or sacrificing any of the advantages of the present invention.

I claim:

1. The combination of a recreational vehicle having an outer metal skin, an awning mounted to the outer metal skin, said awning having a metal cover connected to an awning fabric, said metal cover being movable between a storage condition wherein said awning fabric is rolled and covered by said metal cover and a use condition wherein said awning fabric extends away from the vehicle to provide shade, a latch mechanism having a hook mechanism and a receiver mechanism, said hook mechanism mounted on said metal cover such that when the awning is in a rolled up condition the hook mechanism is movable between an engaged locked position and an unengaged unlocked position, said receiver mechanism having a catch mounted on said recreational vehicle for engaging a portion of said hook mechanism in the engaged locked position of said hook mechanism, said hook mechanism having an apertured actuating portion for engagement by a remotely controlled actuator for moving said hook mechanism from an engaged locked position to an unengaged unlocked position and from an unengaged unlocked position to an engaged locked position by an operator remote from the latch mechanism.

2. The combination of claim 1, wherein a latch mechanism is positioned near each end of said awning.

3. The combination of claim 1, wherein said hook mechanism is a single piece of metal having a hook lying in a first plane, said apertured actuating portion lying in a second plane, said first and second planes being rotated about 90° one from the other.

4. The combination of claim 3, and further comprising a plastic washer intermediate said hook mechanism and the awning cover to facilitate rotational movement of said hook between the locked and unlocked positions thereof.

5. The combination of claim 4, wherein said receiver mechanism is a single piece of metal having a portion thereof formed into a loop for engaging said hook.

6. The combination of claim 5, and further comprising a fastener having a head mounting said hook mechanism to said cover and a plastic washer on each side of said metal cover, one of said washers being trapped between said hook mechanism and said metal cover and the other washer being trapped between said metal cover and the head of said fastener.

* * * * *